United States Patent
Shafer et al.

(10) Patent No.: US 6,946,944 B2
(45) Date of Patent: Sep. 20, 2005

(54) INDUCTOR COIL AND METHOD FOR MAKING SAME

(75) Inventors: Timothy M. Shafer, Yankton, SD (US); Brett W. Jelkin, Windsor, CO (US)

(73) Assignee: Vishay Dale Electronics, Inc., Columbus, NE (US)

( * ) Notice: Subject to any disclaimer, the term of this patent is extended or adjusted under 35 U.S.C. 154(b) by 126 days.

(21) Appl. No.: 10/244,777

(22) Filed: Sep. 16, 2002

(65) Prior Publication Data

US 2003/0016114 A1 Jan. 23, 2003

Related U.S. Application Data

(63) Continuation of application No. 09/547,155, filed on Apr. 11, 2001, now Pat. No. 6,460,244, and a continuation of application No. 09/546,859, filed on Apr. 10, 2000, now Pat. No. 6,449,829, which is a division of application No. 09/271,748, filed on Mar. 18, 1999, now Pat. No. 6,198,375, which is a division of application No. 08/963,244, filed on Nov. 3, 1997, now Pat. No. 6,204,744, which is a continuation of application No. 08/503,655, filed on Jul. 18, 1995, now abandoned.

(51) Int. Cl.[7] .............................................. H01F 27/02
(52) U.S. Cl. ..................... 336/96; 336/83; 336/192; 336/200; 29/602.1; 29/841
(58) Field of Search .................. 336/83, 192, 200, 336/225, 232, 233, 96; 29/602.1, 605, 841, 842, 848, 854, 855, 856, 857, 858

(56) References Cited

U.S. PATENT DOCUMENTS

| | | |
|---|---|---|
| 2,568,169 A | 9/1951 | Raczynski |
| 4,543,554 A | 9/1985 | Muellenheim et al. |
| 4,776,980 A | 10/1988 | Ruffini |
| 5,291,173 A | 3/1994 | Yerman et al. |
| 5,381,124 A | 1/1995 | Roshen |
| 5,398,400 A | 3/1995 | Breen |
| 5,414,401 A | 5/1995 | Roshen et al. |
| 5,446,428 A | 8/1995 | Kumeji et al. |
| 5,495,213 A | 2/1996 | Ikeda |
| 6,198,275 B1 | 3/2001 | Wolf et al. |
| 6,204,744 B1 | 3/2001 | Shafer et al. |

FOREIGN PATENT DOCUMENTS

| | | | |
|---|---|---|---|
| DE | 1764087 | | 4/1971 |
| EP | 0439389 | | 7/1991 |
| EP | 0469609 | | 5/1992 |
| FR | 2721431 | | 12/1995 |
| GB | 2 303 494 A | | 2/1997 |
| JP | 62-013005 | * | 1/1987 |
| JP | 63-278317 | * | 11/1988 |
| JP | 04-115507 | * | 4/1992 |
| JP | 04129206 | | 4/1992 |
| JP | 04196507 | | 7/1992 |
| JP | 04-286305 | * | 10/1992 |
| JP | 4-286305 | * | 10/1992 |
| JP | 6-61059 | | 3/1994 |

* cited by examiner

Primary Examiner—Tuyen T. Nguyen
(74) Attorney, Agent, or Firm—McKee, Voorhees & Sease, P.L.C.

(57) ABSTRACT

A high current, low profile inductor (IHLP) includes a conductive coil molded within an inductor body substantially free from ferrite materials and comprising powdered iron materials. The method comprises pressure molding the inductor body substantially free from ferrite materials and comprising a powdered magnetic material within the hollow core of the coil and completely around the coil so that the magnetic material is substantially free from voids therein without shorting out the coil.

11 Claims, 3 Drawing Sheets

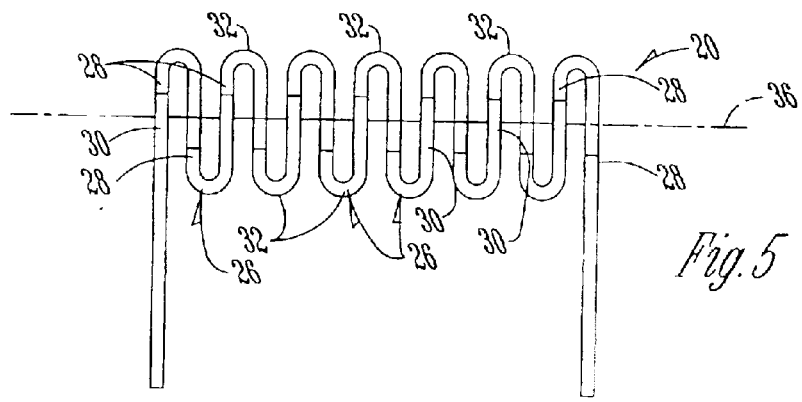
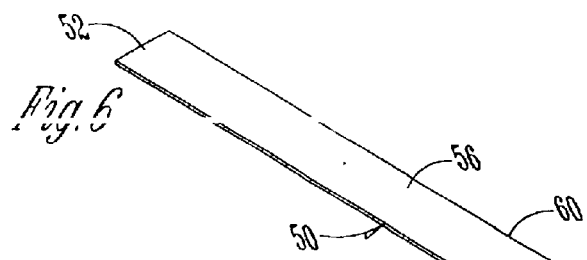
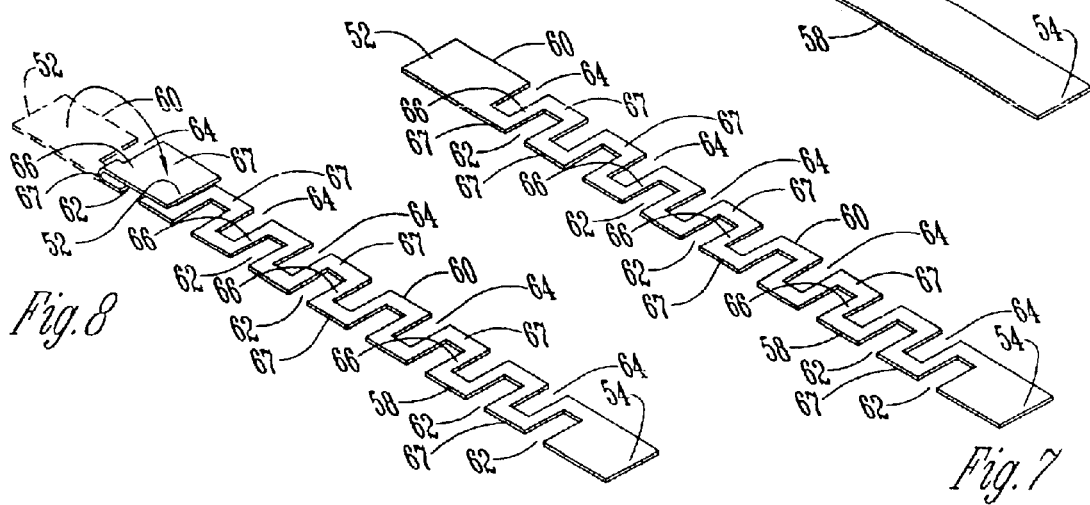
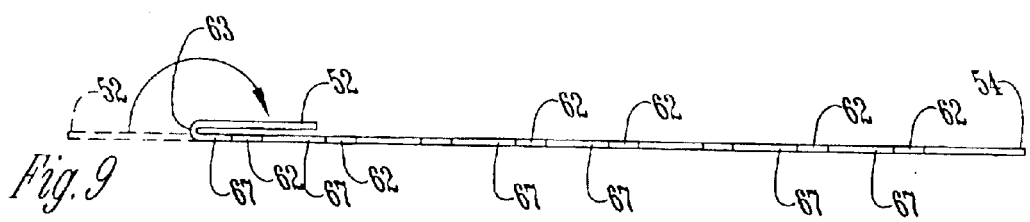
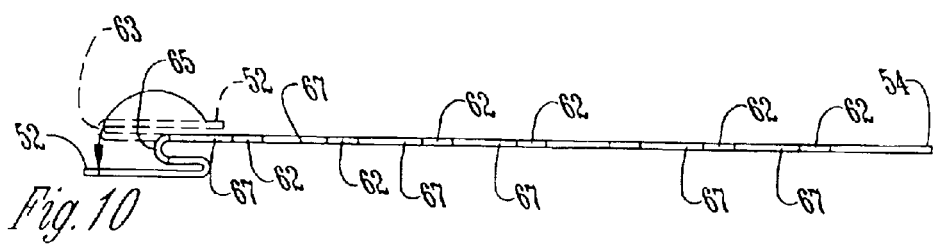

INDUCTOR COIL AND METHOD FOR MAKING SAME

CROSS-REFERENCE TO RELATED APPLICATIONS

This application is a continuation of Ser. No. 09/546,859, filed on Apr. 10, 2000 and issuing on Sep. 17, 2002 as U.S. Pat. No. 6,449,829, which is a divisional of Ser. No. 09/271,748, filed on Mar. 18, 1999, and issuing as U.S. Pat. No. 6,198,375 on Mar. 6, 2001. This application is also a continuation of application Ser. No. 09/547,155, filed Apr. 11, 2002, now U.S. Pat. No. 6,460,244 issued Oct. 8, 2002, which is a divisional of application Ser. No. 08/963,224 filed Nov. 3, 1997, now U.S. Pat. No. 6,204,744, which is a continuation of application Ser. No. 08/503,655 filed Jul. 18, 1995, now abandoned. The Specification and Drawings of application Ser. No. 09/547,155, now U.S. Pat. No. 6,460,244, are hereby incorporated by reference.

BACKGROUND OF THE INVENTION

The present invention relates to an inductor coil structure and method for making same. The coil structure of the present invention is preferably for use in a high current low profile inductor commonly referred to by the designation IHLP. However, the particular coil structure may be used in other types of inductors.

Inductor coils have in the prior art been constructed from various shapes of materials formed into various helical shapes. However, there is a need for an improved inductor coil structure which is simple to manufacture and which provides an efficient and reliable inductance coil.

Therefore, a primary object of the present invention is the provision of an improved inductor coil structure and method for making same.

A further object of the present invention is the provision of an inductor coil structure which can be used in a high current low profile inductor having no air spaces in the inductor, and which includes a magnetic material completely surrounding the coil.

A further object of the present invention is the provision of an inductor coil structure which includes a closed magnetic system which has self-shielding capability.

A further object of the present invention is the provision of an inductor coil structure which maximizes the utilization of space needed for a given inductance performance so that the inductor can be of a minimum size.

A further object of the present invention is the provision of an improved inductor coil structure which is smaller, less expensive to manufacture, and is capable of accepting more current without saturation than previous inductor coil structures.

A further object of the present invention is the provision of an inductor coil structure which lowers the series resistance of the inductor.

SUMMARY OF THE INVENTION

The foregoing objects may be achieved by a high current low profile inductor comprising a conductor coil having first and second coil ends. A magnetic material surrounds the conductor coil to form an inductor body. The inductor coil comprises a plurality of coil turns extending around a longitudinal coil axis in an approximately helical path which progresses axially along the coil axis. The coil turns are formed from a flat plate having first and second opposite flat surfaces, at least a portion of each of the flat surfaces of the coil turns facing in a axial direction with respect to the coil axis.

The method for making the inductor includes taking an elongated plate conductor having a first end, a second end, opposite side edges, opposite flat surfaces, and a longitudinal plate axis. A plurality of slots are cut in each of the opposite side edges of the plate conductor so as to form the plate conductor into a plurality of cross segments extending transversely with respect to the plate axis and a plurality of connecting segments extending approximately axially with respect to the plate axis. The connecting segments connect the cross segments together into a continuous conductor which extends in a sine shaped path. As used herein the term "sine shaped" refers to any shape which generally conforms to a sine curve, but which is not limited to a continuous curve and may include apexes, squared off corners or other various shapes.

After cutting the slots in the opposite side edges of the plate conductor the connecting segments are bent along one or more bend axes extending transversely with respect to the plate axis so as to form the plate conductor into a plurality of accordion folds, each of which comprise one of the cross segments and a portion of one of the connecting segments. In the resulting structure, the cross segments and the connecting segments form a continuous conductor coil of approximate helical shape having first and second opposite ends.

BRIEF DESCRIPTION OF THE FIGURES OF THE DRAWINGS

FIG. 5 is an elevational view taken along lines 5—5 of FIG. 4.

FIG. 6 is a perspective view of an elongated conductor blank from which the inductor coil is formed.

FIG. 7 shows the blank of FIG. 6 after the formation of slots extending inwardly from the opposite edges thereof.

FIG. 8 is a view similar to FIG. 7, showing the first folding step in the formation of the inductor coil of the present invention.

FIG. 9 is a side elevational view showing the same folding step shown in FIG. 8.

FIG. 10 is a view similar to 8 and showing a second folding step in the process for making the inductor coil of the present invention.

DETAILED DESCRIPTION OF THE PREFERRED EMBODIMENT

Figure 1:
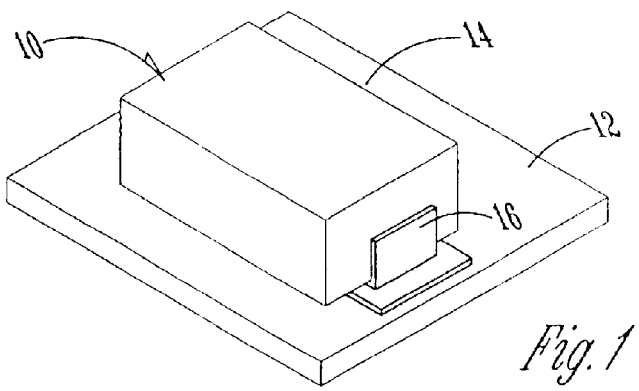
FIG. 1 is a perspective view of the inductor constructed in accordance with the present invention and mounted upon a circuit board.

Referring to the drawings the numeral 10 generally designates an inductor of the present invention mounted upon a circuit board 12. Inductor 10 includes an inductor body 14 having a first lead 16 and a second lead 18 extending therefrom and being folded over the opposite ends of body 14. Leads 16, 18 are soldered or otherwise electrically connected on the circuit board 12.

Figure 2:
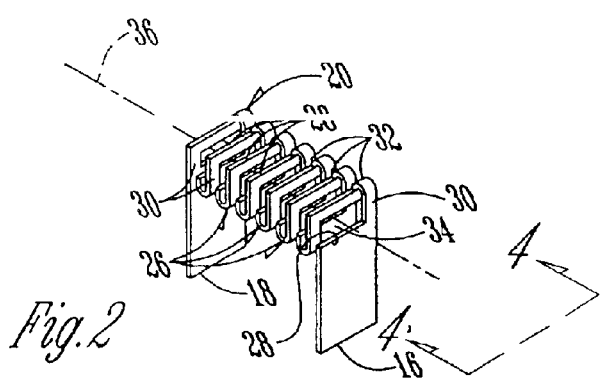
FIG. 2 is a pictorial view of the coil of the inductor before the molding process.
Figure 3:
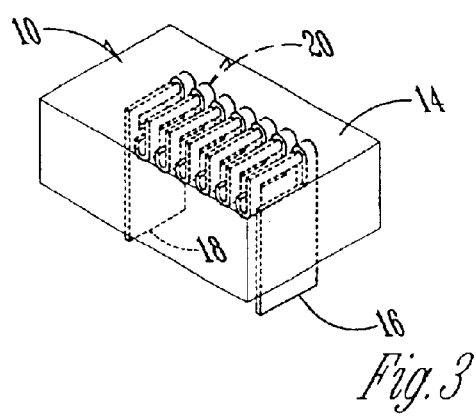
FIG. 3 is a pictorial view of the inductor of the present invention after the molding process is complete, but before the leads have been formed.
Figure 4:
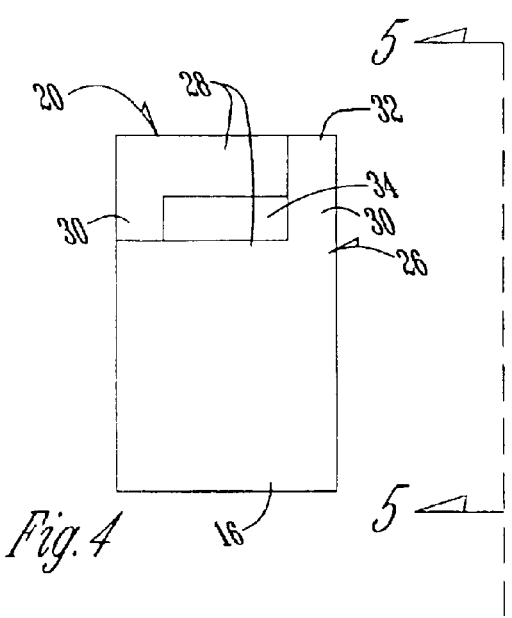
FIG. 4 is an end elevational view taken along line 4—4 of FIG. 2.

Referring to FIG. 2, the inductor coil of the present invention is generally designated by the numeral 20. Leads 16, 18 form the ends of coil 22. Between leads 16, 18 are a plurality of L-shaped coil segments 26 each comprising a horizontal leg 28 and a vertical leg 30. Vertical leg 30 terminates at a connecting segment 32 which is folded over at approximately 180° so as to create an accordion like configuration for inductor coil 20. The L-shaped coil segments are connected together to form a helical coil having an open coil center 34 extending along a longitudinal coil axis 36.

FIGS. 6–10 show the process for making the coil 20. Initially as shown in FIG. 6 a blank flat conductor plate 50 formed of copper or other electrically conductive material includes: first and second ends 52, 54; a pair of opposite flat surfaces 56; and a pair of opposite side edges 58, 60.

FIG. 7 shows the first step in forming the coil 20. In this step a plurality of slots 62, 64 are cut in the opposite edges 58, 60 respectively of the blank flat plate 50. Various cutting methods may be used such as stamping or actual cutting by laser or other cutting tools known in the art.

Upon completion of the cutting operation, the blank 50 is transformed into an elongated sine shaped body formed from a plurality of cross segments 66 extending transversely to the longitudinal axis of plate 50 and a plurality of connecting segments 67 extending axially with respect to the longitudinal axis of plate 50. The segments 66, 67 form a continuous sine shaped configuration as shown in FIG. 7.

FIG. 8 shows the next step in forming the coil 20. The end 52 is folded over at an angle of 180° to form the 180° angle bend 63 in the first connecting segment 67. FIG. 10 shows a second bend 65 which is in the next connecting segment 67. Bends 63, 65 are in opposite directions, and are repeated until an accordion like structure is provided similar to that shown in FIG. 5.

In FIG. 5 the coil 20 includes opposite ends 16, 18 which are formed from the opposite ends 52, 54 of blank 50. The cross segments 66 of blank 50 form the first horizontal legs 28 of coil 20, and the connecting segments 67 of blank 50 form the second vertical legs 30 and the connecting segments 32 of coil 20.

An example of a preferred material for coil 20 is a copper flat plate made from OFHC copper 102, 99.95% pure.

The magnetic molding material of body 14 is comprised of a powdered iron, a filler, a resin, and a lubricant. The preferred powdered material is manufactured by BASF Corporation, 100 Cherryhill Road, Parsippany, N.J. under the trade designation Carbonyl Iron, Grade SQ. This SQ material is insulated with 0.875% mass fraction with 75% $H_3PO4$.

An epoxy resin is also added to the mixture, and the preferred resin for this purpose is manufactured by Morton International, Post Office Box 15240, Reading, Pa. under the trade designation Corvel Black, Number 10-7086.

In addition a lubricant is added to the mixture. The lubricant is a zinc stearate manufactured by Witco Corporation, Box 45296, Houston Tex. under the product designation Lubrazinc W.

Various combinations of the above ingredients may be mixed together, but the preferred mixture is as follows:

1,000 grams of the powdered iron.
3.3% by weight of the resin.
0.3% by weight of the lubricant.

The above materials (other than the lubricant) are mixed together and then acetone is added to wet the material to a mud-like consistency. The material is then permitted to dry and is screened to a particle size of –50 mesh. The lubricant is then added to complete the material 82. The material 82 is then ready for pressure molding.

The next step in the process involves compressing the material completely around the coil 20 so that it has a density produced by exposure to pressure of from 15 to 25 tons per square inch. This causes the powdered material 82 to be compressed and molded tightly completely around the coil so as to form the inductor body 14 shown in FIG. 1 and in FIGS. 11–13.

Figure 11:
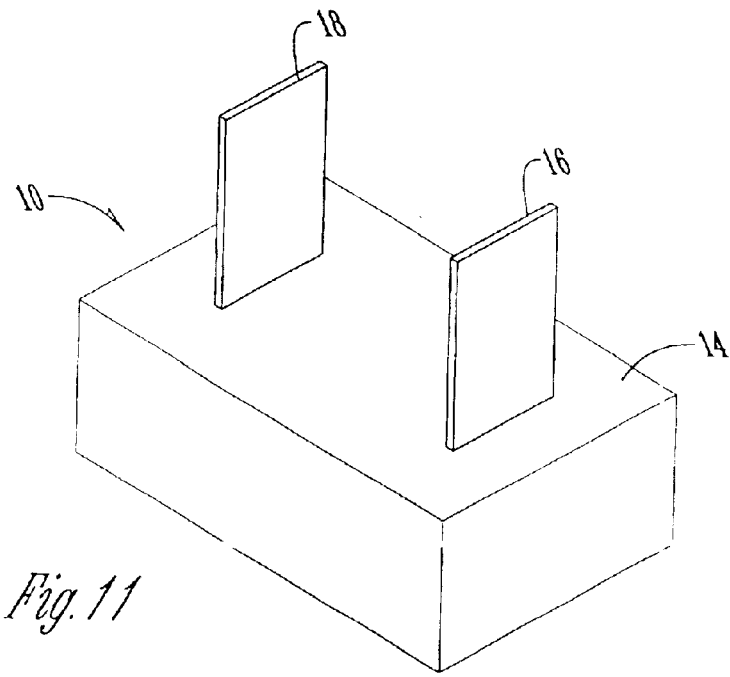
FIG. 11 is an inverted pictorial view of the inductor after it has been pressed, but before the leads have been formed.
Figure 12:
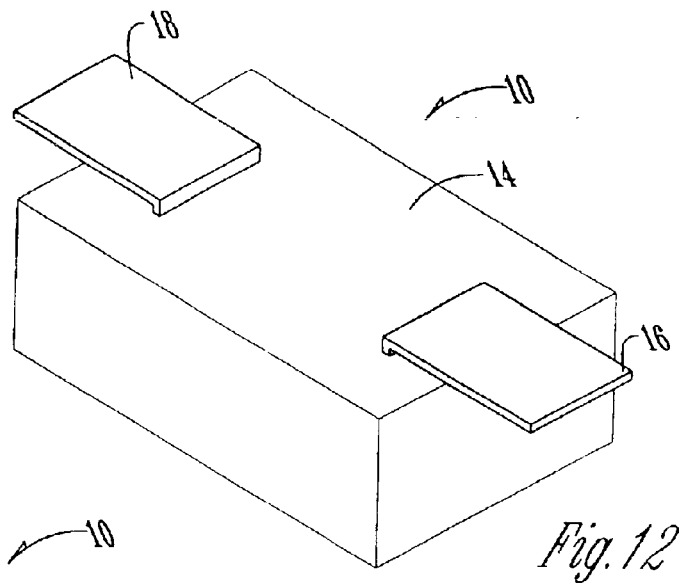
FIG. 12 is a view similar to FIG. 11 showing the inductor after partial forming of the leads.
Figure 13:
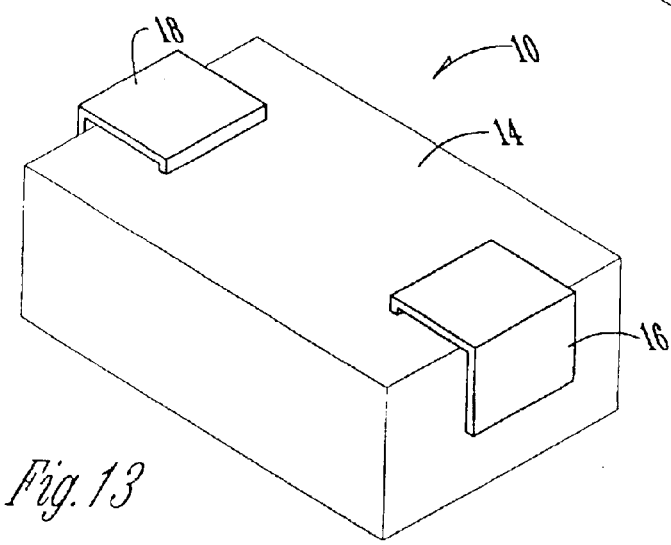
FIG. 13 is a view similar to FIGS. 11 and 12 showing the final forming of the leads.

At this stage of the production the molded assembly is in the form which is shown in FIG. 11. After baking, the leads 16, 18 are formed or bent as shown in FIGS. 12 and 13. The molded assemblies are then baked at 325° F. for one hour and forty-five minutes to set the resin.

When compared to other inductive components the IHLP inductor of the present invention has several unique attributes. The conductive coil, lead frame, magnetic core material, and protective enclosure are molded as a single integral low profile unitized body that has termination leads suitable for surface mounting. The construction allows for maximum utilization of available space for magnetic performance and is magnetically self-shielding.

The unitary construction eliminates the need for two core halves as was the case with prior art E cores or other core shapes, and also eliminates the associated assembly labor.

The unique conductor winding of the present invention allows for high current operation and also optimizes magnetic parameters within the inductor's footprint.

The manufacturing process of the present invention provides a low cost, high performance package without the dependence on expensive, tight tolerance core materials and special winding techniques.

The magnetic core material has high resistivity (exceeding 3 mega ohms) that enables the inductor as it is manufactured to perform without a conductive path between the surface mount leads. The magnetic material also allows efficient operation up to 1 MHz. The inductor package performance yields a low DC resistance to inductance ratio of two milliOhms per microHenry. A ratio of 5 or below is considered very good.

The unique configuration of the coil 20 reduces its cost of manufacture. Coil 20 may be used in various inductor configurations other than IHLP inductors.

In the drawings and specification there has been set forth a preferred embodiment of the invention, and although specific terms are employed these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for making an inductor comprising:
   forming an inductor element having first and second inductor ends from an electrically conductive material;
   creating first and second terminal ends for the inductor element either by attaching the first and second terminal ends to first and second inductor ends of the inductor element or by forming the first and second terminal ends from the first and second inductor ends of the inductor element;

making a mixture comprising a resin and an electrically insulated non-ferrite powdered magnetic material;

compressing the mixture of resin and powdered magnetic material without liquefying the resin tightly around the inductor element to create an inductor body, the insulated magnetic material shielding the inductor element and being in contact with the inductor element without shorting out against the inductor element;

the compressing step being accomplished without injection molding;

leaving the first and second terminal ends outside the inductor body during the compressing step.

2. The method according to claim 1 wherein the step of forming an inductor element comprises forming an inductor coil of the electrically conductive material, the inductor coil having a coil center.

3. The method according to claim 2 wherein the step of compressing the mixture tightly around the inductor coil further comprises compressing the mixture into the coil center and outside the inductor coil in a single compressing step so that the electrically insulated magnetic material contacts the inductor coil but does not short out against the inductor coil.

4. The method according to claim 3 wherein the step of forming the inductor coil further comprises forming a plurality of helical coil turns therein.

5. The method according to claim 1 wherein a lubricant is added to the mixture before the compressing step.

6. The method according to claim 5 and further comprising adding a solvent to the mixture of magnetic materials and epoxy before the compressing step; drying the mixture having the acetone added; and screening the mixture to a predetermined particle size before the compressing step.

7. The method according to claim 1 and further comprising applying heat to the inductor body after the compressing step to set the resin.

8. A method for making an inductor comprising:

making an inductor coil having first and second coil ends from an electrically conductive material;

forming first and second terminal ends for the inductor coil either by attaching the first and second terminal ends to the first and second coil ends or by forming the first and second terminal ends from the first and second coil ends of the inductor coil;

making a mixture comprising a resin and an electrically insulated non-ferrite powdered magnetic material;

adding a lubricant to the mixture;

compressing the mixture having the lubricant added without liquefying the resin tightly round the inductor coil and within the coil center to create an inductor body, the insulated magnetic material shielding the inductor coil and being in contact with the inductor coil both within and outside the coil center without shorting our against the inductor coil;

the compressing step being accomplished without injection molding;

leaving the first and second terminal ends outside the inductor body during the compressing step; and baking the inductor body at a predetermined temperature to set the resin after the compressing step is completed.

9. The method according to claim 8 wherein the step of forming an inductor coil further comprises forming an inductor coil having more than one helical turn.

10. The method according to claim 8 and further comprising wetting the mixture of resin and magnetic material and then drying the wetted mixture before the compressing step.

11. The method according to claim 10 and further comprising screening the mixture to a predetermined particle size after the drying step and before the compressing step.

* * * * *

UNITED STATES PATENT AND TRADEMARK OFFICE
CERTIFICATE OF CORRECTION

PATENT NO. : 6,946,944 B2
DATED : September 20, 2005
INVENTOR(S) : Shafer et al.

It is certified that error appears in the above-identified patent and that said Letters Patent is hereby corrected as shown below:

Column 6,
Line 17, should read -- within and outside the coil center without shorting out --.

Signed and Sealed this

Twenty-ninth Day of November, 2005

JON W. DUDAS
*Director of the United States Patent and Trademark Office*